(12) United States Patent
Nilsen et al.

(10) Patent No.: US 7,625,416 B2
(45) Date of Patent: Dec. 1, 2009

(54) INLET DEVICE AND A METHOD OF CONTROLLING THE INTRODUCTION OF A FLUID INTO A SEPARATOR

(75) Inventors: Pål Jahre Nilsen, Bødalen (NO); Jarle Michaelsen, Spikkestad (NO); Ivar Balk, Jar (NO)

(73) Assignee: Aibel AS, Billingstad (NO)

( * ) Notice: Subject to any disclaimer, the term of this patent is extended or adjusted under 35 U.S.C. 154(b) by 554 days.

(21) Appl. No.: 10/555,814

(22) PCT Filed: May 10, 2004

(86) PCT No.: PCT/IB2004/001476

§ 371 (c)(1),
(2), (4) Date: Nov. 13, 2006

(87) PCT Pub. No.: WO2004/098783

PCT Pub. Date: Nov. 18, 2004

(65) Prior Publication Data

US 2007/0095032 A1 May 3, 2007

(30) Foreign Application Priority Data

May 8, 2003 (NO) .................................. 20032072

(51) Int. Cl.
*B01D 45/12* (2006.01)
(52) U.S. Cl. ........................... 55/418; 55/452; 55/459.1
(58) Field of Classification Search .................... 55/418, 55/447, 452, 459.1
See application file for complete search history.

(56) References Cited

U.S. PATENT DOCUMENTS

| 1,897,195 | A | | 2/1933 | Howden |
| 1,914,282 | A | | 6/1933 | O'Toole |
| 3,034,647 | A | * | 5/1962 | Giesse ........................ 209/710 |
| 3,672,503 | A | | 6/1972 | Mark |
| 5,651,466 | A | | 7/1997 | Satomi |
| 6,270,544 | B1 | * | 8/2001 | Mencher et al. ............... 55/318 |

FOREIGN PATENT DOCUMENTS

| GB | 2116457 A | 9/1983 |
| NO | 171300 C | 2/1993 |
| NO | 315640 B1 | 10/2003 |
| WO | WO 8705234 A1 | 9/1987 |

* cited by examiner

*Primary Examiner*—Robert A Hopkins
(74) *Attorney, Agent, or Firm*—Venable LLP; Eric J. Franklin (57) ABSTRACT

An inlet device to a separator including a generally tubular outer wall and a generally tubular inner wall. The walls define at least a part of a first annular path between them. An inlet opening provides for the passage of a fluid through the outer wall into the first annular path. At least one communication channel provides for the passage of a fluid from the first annular path into the second annular path. At least one movable closing element provides for at least partial closure of the fluid passage from the first path into the second path. The communication channel(s) is/are arranged to extend along the outside of the inner wall downwards from the first path into the second path, wherein the second path is arranged below the first path.

14 Claims, 7 Drawing Sheets

1. Device inlet
2. Tangential cyclone inlet
3. Flexible nozzles
4. Bars for operation of flexible nozzles
5. Actuator
6. Gas outlet to separator or elsewhere
7. Liquid and/or sand outlet
8. Pressure vessel
9. Separator

INLET DEVICE AND A METHOD OF CONTROLLING THE INTRODUCTION OF A FLUID INTO A SEPARATOR

TECHNICAL FIELD

The present invention relates to an inlet device to a separator, said device comprising: a generally tubular outer wall and a generally tubular inner wall, said outer and inner wall defining at least a part of a first annular path between them, and an inlet opening through the outer wall into the first annular path for the at least one passage of a fluid from the first annular path into a second annular path inside the inner tubular wall or from the first annular path along the outside of the inner tubular wall downwards into the second annular path, said fluid comprising two or more phases being subjected to separation.

The invention also relates to a method of controlling the introduction of a fluid into a separator, preferably a cyclone separator, in which the fluid is introduced, under tangential g-force-generating movement thereof into a second annular path via an inlet opening through an outer tubular wall and a first annular path between the outer tubular wall and inner tubular wall, said fluid comprising two or more phases being subjected to separation.

The invention is preferably applicable to all kinds of oil production plants or installations, including land-based ones, but is particularly applicable to offshore applications (topside as well as subsea), and to applications in which oil/water emulsions are extracted from a plurality of wells simultaneously.

BACKGROUND OF THE INVENTION

Most separation systems handle well stream from several wells. The wells are choked to a common pressure into a manifold and flows in a common pipe to a first separator that may be a multiphase cyclone separator. To reduce the momentum of the incoming gas/liquid well stream in the separator an inlet device is normally mounted inside the separator. Traditionally, the inlet device has been a simple splash plate or a set of vanes. More recently, new inlet cyclones have been introduced to benefit from high g-forces to eliminate foaming etc. These inlet cyclones normally reduce the foam tendency, but they may create a very complex emulsion of oil and water that often can be impossible to separate in a subsequently arranged gravity separator.

Recently, some oil companies experience new challenges for their separation process. The fact that some of the wells are oil continuous and some are water continuous may cause complex emulsion patterns. Water droplets may trap oil droplets that, in their turn, may trap even smaller water droplets. The various wells may be choked differently, thus having large variations in droplet sizes. This adds to the complexity of the incoming gas/oil/water mixture. The water cut for each well will change during the production, typically from 5% water to 90% water. The inlet separation cyclone thus needs to be flexible in handling the various types of mixtures. In particular, for complex emulsions properly applied shear level/g-force level may positively break complex emulsions rather than further stabilizing the emulsions.

PRIOR ART

The Norwegian patent no. 315640 discloses a separator that is suitable for the separation of gas, liquid and solid particles, and that comprises a known cyclone that has an inlet device.

The cyclone takes advantage of g-forces for the separation. The specific design of the communication channels through the inner tubular wall of the inlet device contributes to achieve this task. Normally, mixtures of oil, water and sand particles are introduced into the cyclone. The cyclone has a gas outlet opening in an outer tubular wall on a level above the inlet device. Openings are provided in the upper part of the inlet device for permitting separated gas to reach the gas outlet opening. The inner tubular wall is perforated on a level above the inlet device in order to permit water that, under the action of g-forces, rises in an annular path inside the inner tubular wall to reach an annular path outside the inner tubular wall, where the latter path is defined by the space between the inner and outer tubular wall. The inlet device is provided with openings that permit the water to flow down the path outside the inner tubular wall down to the bottom of the cyclone, where a liquid outlet for oil and/or water or a mixture thereof is arranged. At the bottom of the inner tubular wall there is arranged a sloping receiver for solid particles or the like, such as sand, that conduct the sand separated from the liquid inside the inner tubular wall to a sand outlet in the outer tubular wall. The inner tubular wall may be cylindrical or conical.

The dimension and number of communication channels of the inlet device should, however, be adapted to the composition of the mixture introduced and to the pressure thereof. This can not be done easily once the cyclone is positioned in its operational position.

THE OBJECT OF THE INVENTION

One object of the invention is to provide a device and a method by means of which the introduction flow velocity of a medium into a separator can be varied and controlled.

It is also an object of the invention to present a device and a method by means of which a gas/oil/water mixture can be subjected to variable and controllable g-forces with the purpose of handling (separating) foam and emulsions.

Another object of the invention is to present a further development of the type of cyclone disclosed in the patent no. 315640.

BRIEF DESCRIPTION OF THE INVENTION

The object of the invention is achieved by means of the initially defined inlet device, characterised in that it comprises at least one movable closing means for at least partial closure of the fluid passage from said first annular path into said second annular path.

Such a movable closing means preferably comprises a nozzle (or a choke) a turning shutter, a throttle-valve, a shovel, a ring-shaped member in the form of a sliding door or an inlet channel designed as a helical or a "winding stair"-type comprising at least one moveable helical vane or any suitable member by means of which the cross section area of the fluid passage(s) from the first annular path into the second annular path can be locally varied in order to vary and control the flow velocity, and thus the shear forces, of a medium passing through. The movable closing means may also comprise any suitable combination(s) of the above mentioned members. The movable closing means may even stop any such flow passage.

Thus, according to the inventive inlet device of the separator, preferably a cyclone, a flexible g-force of the medium to be separated is accomplished, which substantially facilitates the handling of otherwise unseparable complex emulsions in subsequently arranged gravity separator(s).

In this context it should also be mentioned that the cyclone preferably is arranged standing vertically, and that the flow path in the inlet device is preferably mainly horizontal and/or inclined.

According to a preferred embodiment of the inventive inlet device, it comprises at least one communication channel or fluid passage for the passage of a fluid downwards in the axial direction from the first annular path along the outside of the inner wall into the second annular path, which is arranged below the first annular path, through a "winding stair" or similar type of path.

According to another preferred embodiment of the inventive inlet device, it comprises at least one communication channel or fluid passage extending through the inner wall for the passage of a fluid in a radial direction from the first annular path into the second path inside the inner tubular wall.

According to a preferred embodiment (see FIGS. 1-5) the communication channel or fluid passage extends in the lengthwise direction of the inner tubular wall, and the closing means is movable in said direction. Thereby the closing means can easily be operated by means of any driving means, connected to e.g. a screw device or an actuator, arranged on top of the cyclone, and can be arranged to open or close depending on the gravitational force if such driving means would be out of function. The movement direction of the closing means will preferably be perpendicular to the flow direction of the introduced medium or mixture and, therefore, no force of flowing medium must be over-won by the moving closing means.

Preferably, the device comprises a plurality of communication channels each of which is provided with a movable closing means. The communication channels should also be located at a common level or at the end of the first annular path downwards through the bottom around the periphery of the inner wall of the inlet device. Preferably, the communication channels are evenly distributed around the periphery of the inner wall.

Preferably, the device comprises a first end wall and a second end wall, said end walls being in sealing connection to the tubular outer and inner walls, and enclosing between them an annular chamber in which the at least one communication channel is arranged in the inner tubular wall, at least a part of said movable closing means or a piece, such as a guiding rod, connected to said movable closing means being sealingly guided through the first end wall for the activation of the closing means from outside said chamber. Thereby, the inlet device can easily be installed in a cyclone of the kind disclosed in NO 315640 as mentioned above.

The object of the invention is also achieved by means of the initially defined method, which is characterised in that that cross section area of the fluid passage from the first annular path into the second annular path is controlled by means of at least one moveable closing means based on at least one process parameter.

According to one preferred embodiment the fluid is introduced, from the first annular path, into the second annular path via at least one communication channel or fluid passage arranged at the end of the first annular path.

According to another preferred embodiment the fluid is introduced, from the first annular path, into the second annular path inside an inner tubular wall via at least one communication channel or fluid passage through the inner tubular wall.

Such process parameter might be the composition of the medium or mixture introduced into the separator (content of water, oil, sand, etc.), or the pressure thereof. By controlling the cross section area by means of the moveable closing means, such as the communication channel size, the flow velocity of the introduced medium and the g-forces are controlled making it possible to thereby control the foam/emulsion breaking/formation in order to optimise the separation of mixture components.

Preferably, according to one embodiment, the communication channel is closed through a translational and/or rotational movement of the closing means that fits slidingly in the communication channel.

The fluid should be introduced via a plurality of communication channels distributed around the periphery of the inner tubular wall or at the end of the first annular path downwards through the bottom of the inlet device.

The invention also relates to a separator that comprises, or is equipped with an inlet device according to the invention. Preferably, the separator comprises a cyclone.

Further features and advantages of the present invention will be presented in the following detailed description of preferred embodiments of the inventive device.

BRIEF DESCRIPTION OF THE DRAWINGS

Preferred embodiments of the present invention will now be described with reference to the annexed drawings on which.

DETAILED DESCRIPTION OF THE INVENTION

Figure 1:
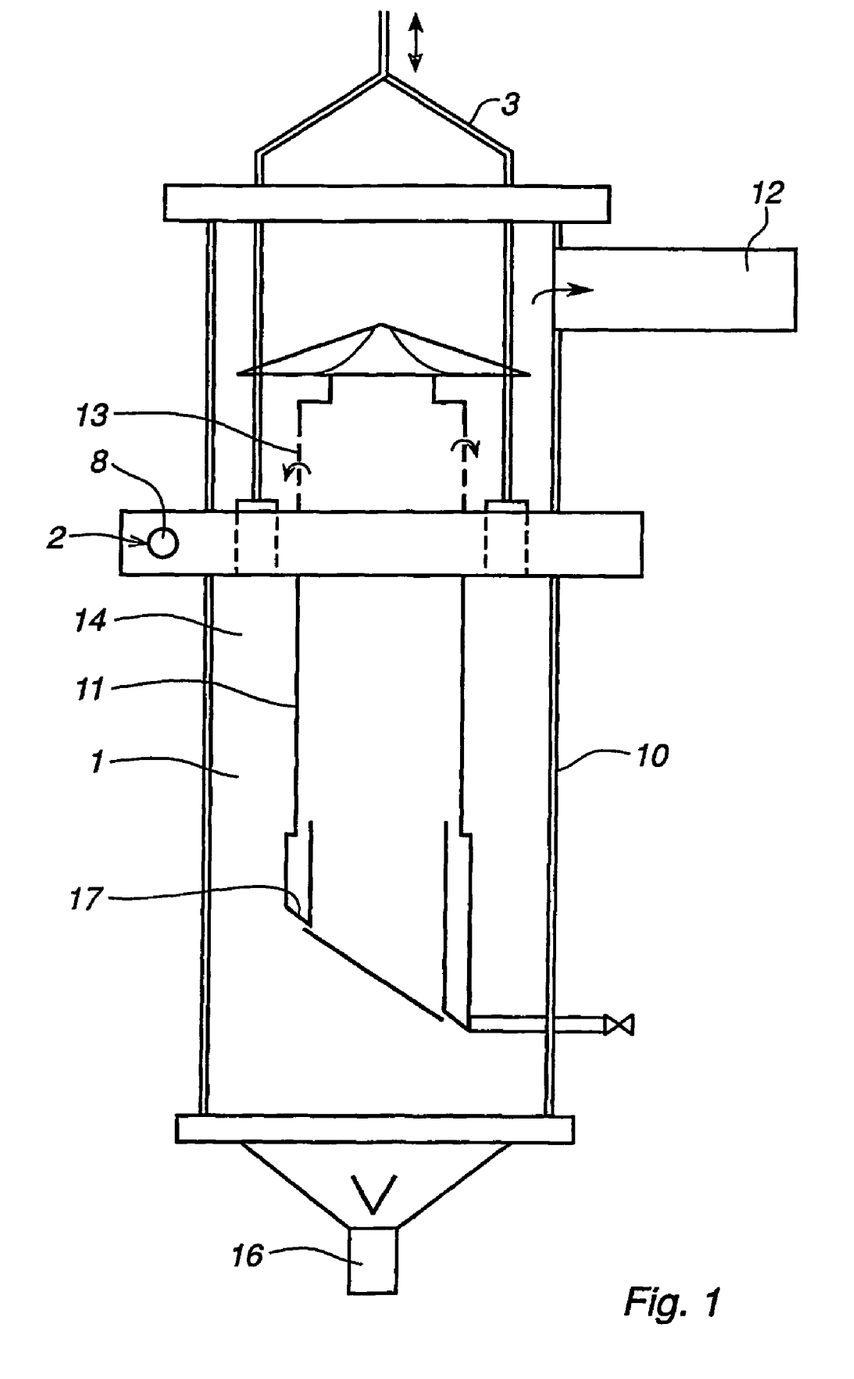
FIG. 1 is a schematic sectional view of a separator equipped with an inlet device according to the invention.

FIG. 1 shows a separator 1 provided with an inlet device 2 according to one embodiment of the invention. The separator 1 defines a multiphase cyclone of the kind as described in e.g. the Norwegian patent no. 315640 for separation of gas, liquid, and solid particles.

Figure 2:
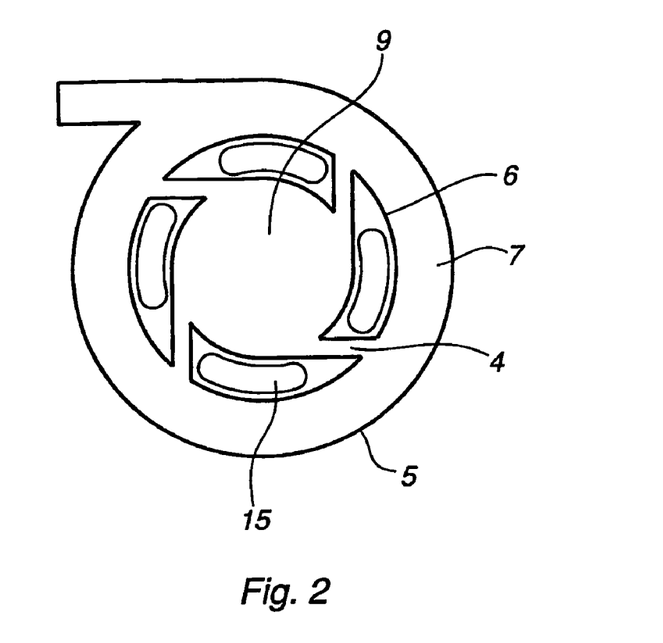
FIG. 2 is a view from above of an inlet device according to prior art, with its upper wall portion removed.
Figure 3:
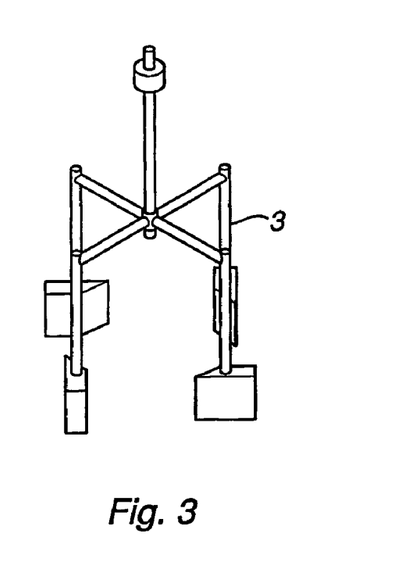
FIG. 3 is a schematic perspective view that shows movable means comprising nozzles or chokes for closing four communication channels in the inlet device according to one embodiment of the invention.
Figure 4:
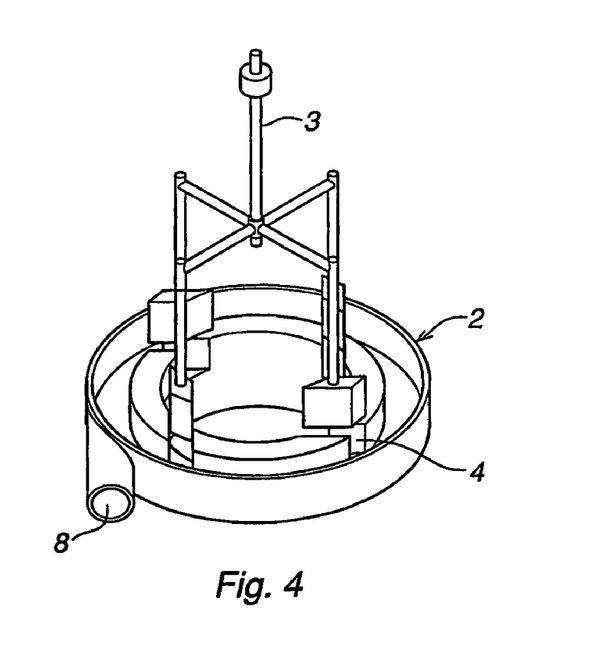
FIG. 4 is a perspective view of an inlet device, comprising movable means for closing as shown in FIG. 3, with its upper wall portion removed.

FIG. 2 shows an inlet device according to prior art that might be arranged in the cyclone 1, while FIGS. 3 and 4 show a further development of the inlet device 2 in accordance with a first preferred embodiment of the invention. The inlet device 2 according to FIGS. 1 to 4 differs from the prior art inlet device in that it comprises means 3 for controllable closure of communication channels 4 in the inlet device. The prior art inlet device of FIG. 2 could here be regarded as a part of the inlet device according to this embodiment of the invention.

The inlet device 2 comprises a generally cylindrical outer wall 5 and a generally cylindrical inner wall 6, the outer and inner wall 5, 6 defining at least a part of a first annular path 7 between them, and an inlet opening 8 through the outer wall 5 into the first annular path 7. The inlet device 2 further comprises in the shown first embodiment four communication channels 4 extending through the inner tubular wall 6 for the passage of a fluid, such as an emulsion, in a radial direction from the first annular path 7 into a second annular path 9 inside the inner tubular wall 6.

The cyclone 1 has an outer tubular pressure bearing wall or cylinder 10 and an inner tubular wall 11, which may be cylindrical and/or conical-shaped. The inlet device 2 is inserted or mounted in the cyclone 1 such that the longitudinal axes of the inner and outer walls 5, 6, 10, 11 of the inlet device 2 and the cyclone 1 are parallel or, preferably, coaxial. The inner periphery of the inner wall 6 of the inlet device 2 is generally co-planar with the inner periphery of the inner wall 11 of the cyclone 1. The second path 9 is part of the path or space inside the inner wall 11 of the cyclone 1.

Mixtures of gas, oil, water and/or solid particles are introduced into the cyclone 1 via the inlet device 2. The cyclone 1 has a gas outlet opening 12 in its outer tubular wall 10 on a level above the inlet device 2. The inner tubular wall 11 of the cyclone 1 is provided with perforations 13 on a level above the inlet device 2 in order to permit water that, under the action of g-forces, rises in the second path 9 inside the inner tubular wall 11 to reach an intermediate space 14 between the inner and outer walls 10, 11 of the cyclone 1. The cyclone may also be provided with a secondary droplet separator as indicated in FIG. 1.

The inlet device is provided with openings 15 (see FIG. 2) that permit the water to flow through it down the intermediate space 14 to the bottom of the cyclone 1, where a liquid outlet 16 is arranged. At the bottom of the inner tubular wall 11 of the cyclone there is arranged a sloping receiver 17 for solid particles, such as sand, that conduct solid particles separated from the liquid inside the inner tubular wall 11 to a particle outlet in the outer tubular wall 10 of the cyclone.

The design of the inlet device 2 according to FIGS. 3 and 4 will now be further discussed.

The inlet opening 8 is tangentially arranged in relation to the inner periphery of the outer wall 5, such that an incoming flow of any media will tend to follow a generally circular path 7 along said inner periphery.

Each of the communication channels 4 that are provided in the inner wall 6 are also tangentially arranged in relation to the inner periphery of the inner wall 6, such that media that flow into the second flow path 9 will flow along the inner periphery of the inner wall 6.

The inlet opening 8 and each of the communication channels have the same tangential direction, such that media flowing in a first tangential direction in the first path 7 will continue to flow in the same tangential direction in the second flow path 9 after having passed through the communication channels 4.

The inner wall 6 has a substantial thickness, and the communication channels 4 extend at least partly tangentially from the outer periphery to the inner periphery thereof. The channels 4 are evenly distributed at a common level.

For the purpose of enabling partial (or even full) closure of one or all communication channels 4 during operation of the cyclone 1, there is provided a movable closing means 3. Preferably, the inlet device comprises a first end wall or an upper wall (not shown) with openings via which the movable closing means 3 or at least a piece connected to said closing means is sealingly guided or displaced through a translational movement into or out of the communication channels for the activation of the closing means 3 from outside said chamber. Thus, the first end wall and a second lower end wall (not shown) enclose between them a chamber in which the communication channel(s) 4 is arranged in the inner tubular wall 6. The cross sections of the individual openings in the upper wall, the closing means 3 and the communication channels correspond to each other.

Preferably, the closing means 3, or any part connected thereto, such as the rod arrangement as shown in FIG. 3 and 4, extend outside the cyclone 1 and are also operable from outside the cyclone 1.

Figures 10A, 10B:
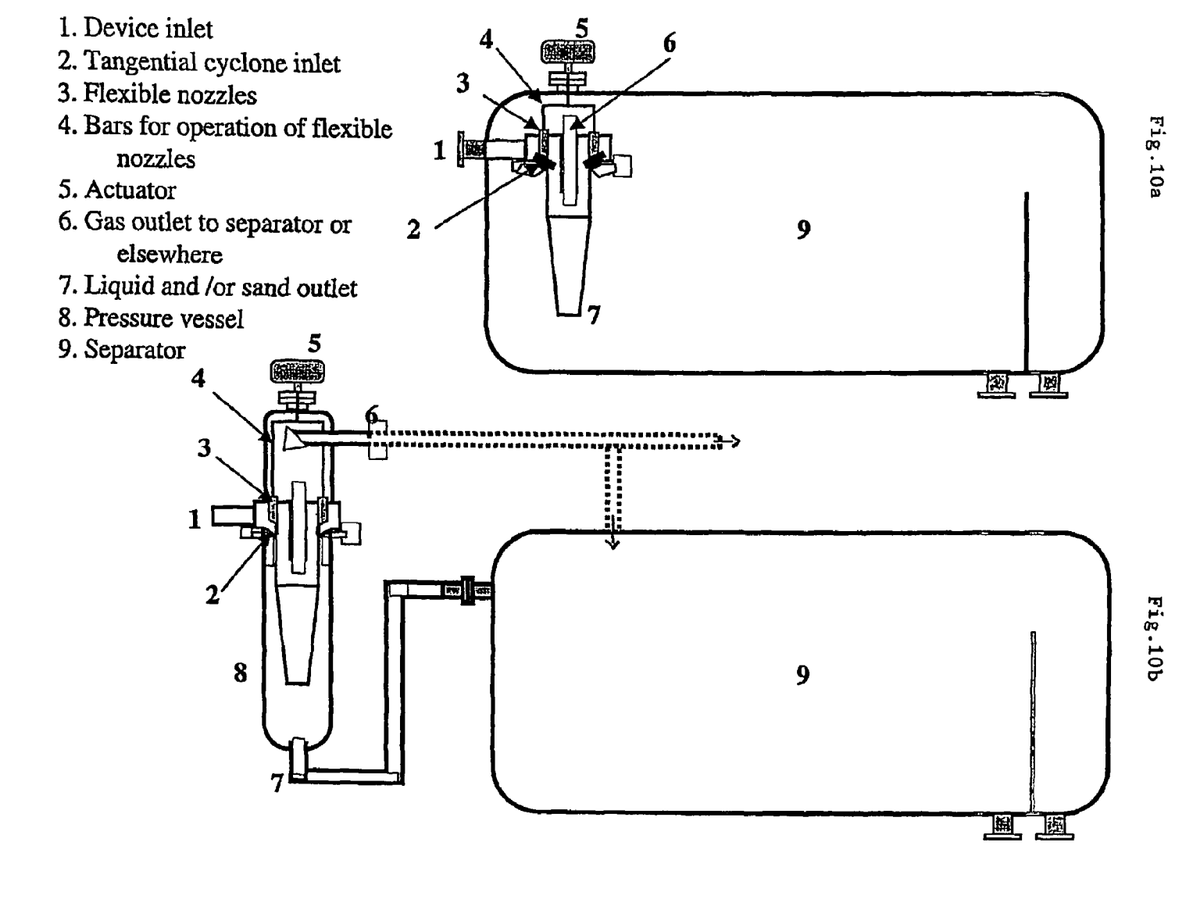
FIG. 10a is a schematic cross sectional view that shows a gravity separator in which a multiphase cyclone with the inventive inlet device is arranged at its inlet.
FIG. 10b is a schematic cross sectional view that shows a separation system comprising a gravity separator and a multiphase cyclone arranged upstream thereof.

In this preferred embodiment, the cyclone is vertically arranged, with its longitudinal axis in vertical orientation. Any driving means (motor, transmission, etc.) equipped with an actuator and a rod arrangement, see for example FIG. 4 and FIG. 10a, b, for displacing the closing means 3 may be arranged on top of the cyclone 1.

Figure 5:
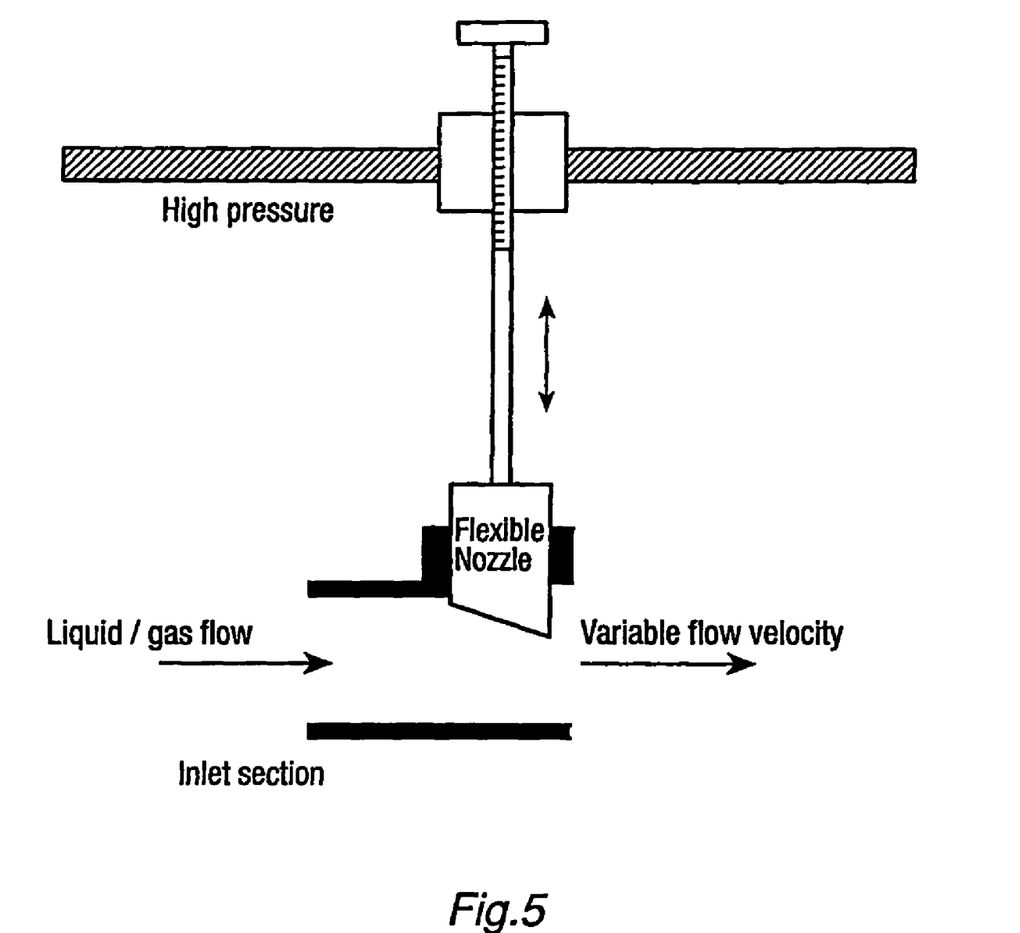
FIG. 5 is a schematic view that shows the pressure and flow conditions relevant in the inlet device according to the invention.

FIG. 5 shows the pressure and flow conditions under which the cyclone 1 and the inlet device 2 are likely to operate. The medium introduced into the cyclone 1 is an oil/water/gas/sand mixture from a number of oil wells. The mixture has a pressure well above atmospheric pressure. The pressure inside the cyclone is well below the pressure of the mixture outside it. Therefore, the pressure of the mixture will be a driving force that promotes a flow of mixture into the cyclone via the inlet opening 8, first path 7 and communication channels 4. The pressure difference will generate high inlet flow velocity and high g-forces on the in-flowing mixture, resulting in favourable cyclone separation of the components thereof. The flow velocity is controlled by means of the closing means 3 in the form of flexible or moveable nozzle. The position or movement of the movable closing means 3 may be based on oil well pressure, that is the pressure of the mixture entering the inlet device 2 of the cyclone 1.

Since the closing means 3 is moved in a direction perpendicular to the flowing direction of the mixture inside the communication channels 4, only a reduced force is required for accomplishing the movement.

Figure 6:
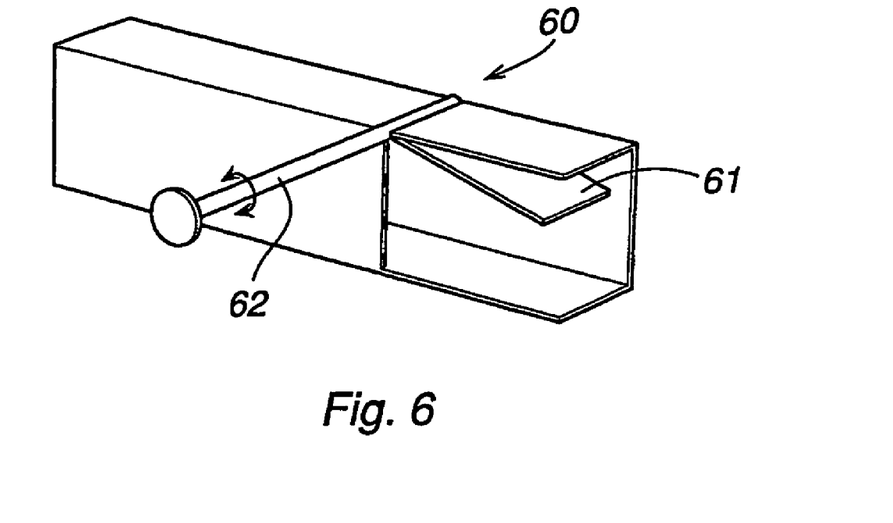
FIG. 6 is a schematic perspective view that shows a movable closing means comprising a turning shutter or a throttle-valve according to another embodiment of the invention.

FIG. 6 shows another design of the movable closing means 60 comprising a turning shutter or a throttle-valve 61. The closing means 60 is actuated by means of an actuator (not shown) connected to a rod 62 in a rotational movement for closing the throttle-valve arranged perpendicularly at the one end of the rod, which rod is moveable projecting in the flow direction of the fluid. Thus, the cross section area of the fluid passage from the first annular flow path into the second annular flow path is controlled. The inlet device according to this embodiment provides a favorable flow pattern in such a way that any solid particles in the fluid will be accelerated in parallel with the walls, thus minimizing the erosion.

Figure 7:
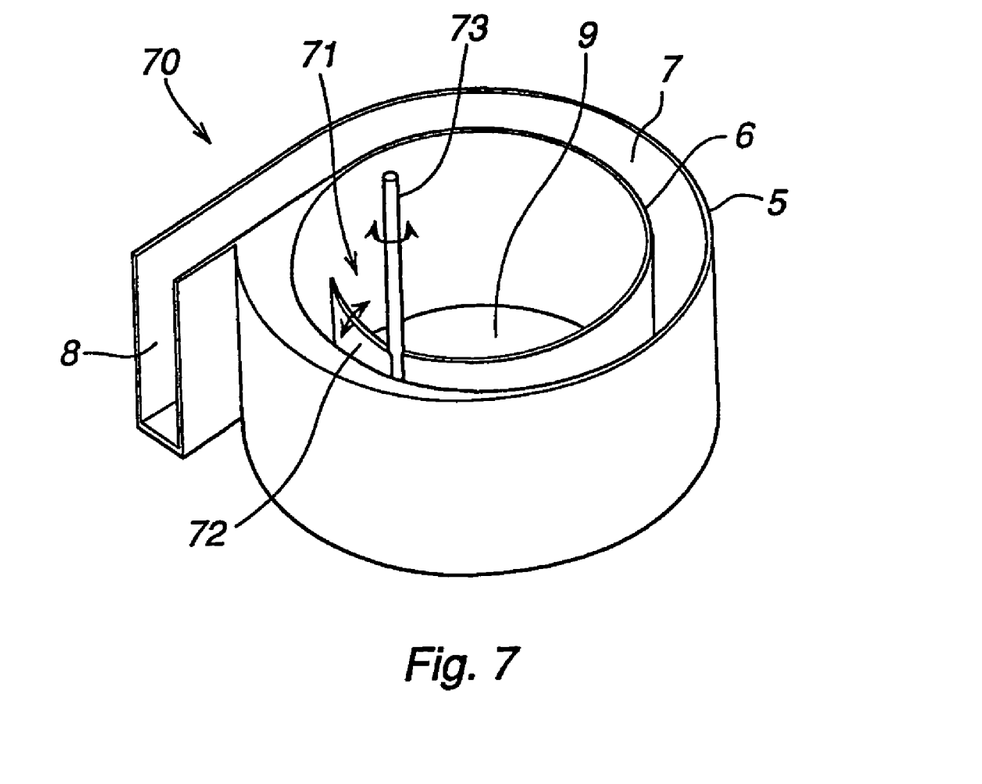
FIG. 7 is a schematic perspective view of an inlet device comprising movable means for closing corresponding to FIG. 6, according to a further embodiment of the invention.

FIG. 7 shows a further embodiment of the inlet device 70, with its upper wall portion removed, comprising one single inlet channel 7 and a movable closing means 71 arranged at the bottom of the inlet device, i.e. at the end of the first flow path 7 defined by the outer cylindrical wall 5 and the inner cylindrical wall 6 said walls being arranged generally concentrically. The movable closing means may however be arranged at any other suitable position in said channel. The fluid to be separated into its components is tangentially introduced to the inlet device via the inlet opening 8 to the first flow path 7 and enters tangentially through the flow passage comprising of the movable closing means into the annular space of the second flow path 9 at least partly defined by the inner cylindrical wall 6. As shown in the figure, the closing means is in the form of a curved vane or a shovel 72 that preferably is arranged as an extension or prolongation of the inner cylindrical wall 6. The vane 72 is actuated by means of an actuator (not shown) connected to a rod 73 by a translation of a rotational axial movement of the rod 73 for closing the flow path 7 by the vane 72 arranged in parallel at the one end of the rod 73 and moveable in the flow cross direction of the fluid.

As an alternative to the movable closing means in FIG. 7, the closing means according to FIG. 6 may be arranged in the inlet device of FIG. 7 as well.

Figure 8A:
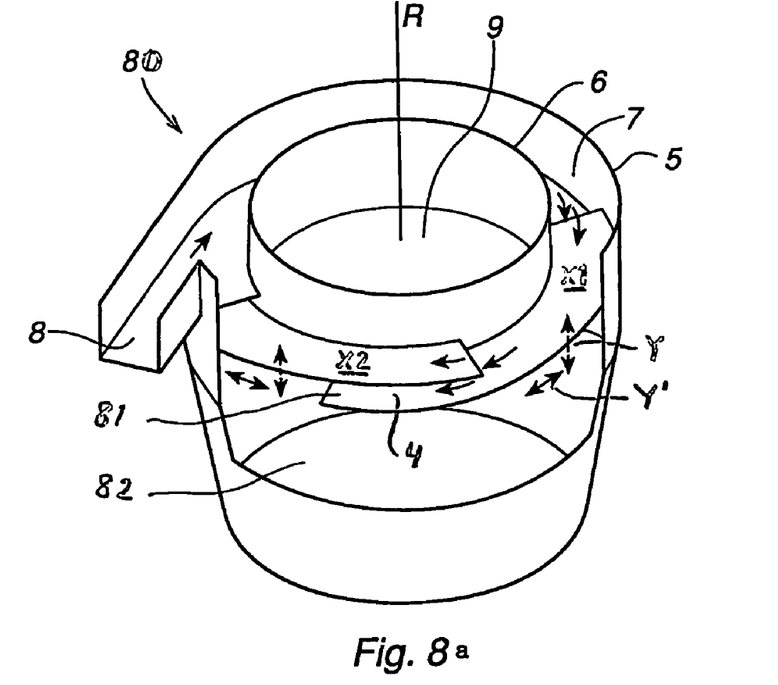
FIG. 8a is a schematic perspective view of an inlet device comprising movable means for closing having a set of curved vanes designed as a helix or a "winding stair" type, according to a further embodiment of the invention.

FIG. 8a shows a further embodiment of the inlet device 80 of a cyclone, with its upper wall portion removed, comprising movable means for closing having a set of curved vanes designed as a helix or a "minding stair" type. It shows a tubular outer wall 5 of the cyclone body and an opening or inlet 8 passing through that wall. Inside the cyclone body is an inner tubular wall 6. The outer and inner walls are concentrically arranged about an axis of rotation R. Between the inner tubular wall 6 and the outer tubular wall 5 are placed at intervals at least two curved vanes X1 and X2. At least one of the curved vanes follows a spiral or helical path for part of its length. At least one of the curved vanes is also rotationally movable in a direction shown by either of the two arrows Y,Y'. By rotating one curved vane relative to the position of another at least in part vertically overlapping vane, the space between them is thereby changed in height, in length of path enclosed, or both.

Fluid led into the inlet device through inlet 8 follows a first annular path 7 around the inner tubular wall 5 passing then at least in part under a curved vane X1, arranged above the first path 7 so as to enter a second annular path. The fluid follows a generally spiral downward path passing between vanes above and below it which overlap each other to a variable extent. The curved vanes are arranged in the tubular walls with a mechanical means so that at least one curved vane, or one set of curved vanes, may be rotated about the centre axis R of the body of the cyclone. Thus, the movable closing means according to this preferred embodiment comprises said movable vane or vanes. By moving particular vanes in relation to the others the size of opening between the vanes and length of path along the vanes are varied to cause a change in any of flow velocity, shear force imposed on the fluid and/or mass per unit time for the fluid passing through the passage downwards from the first annular path(s) into the second annular path(s).

The fluid, a mixture of gas, oil and water (and sand) is subjected in part by the vanes to variable centripetal or gravitational force causing heavier components in the fluid mixture to move successively closer to the outside wall 5 and lighter components to gradually collect close to the inside wall 6 or else fall down inside the body of the cyclone.

The embodiment according to FIG. 8a could preferably be combined with the embodiment according to FIG. 6. The movable closure means according to FIG. 6 is in this case preferably arranged at the inlet of the inlet device.

Figure 8B:
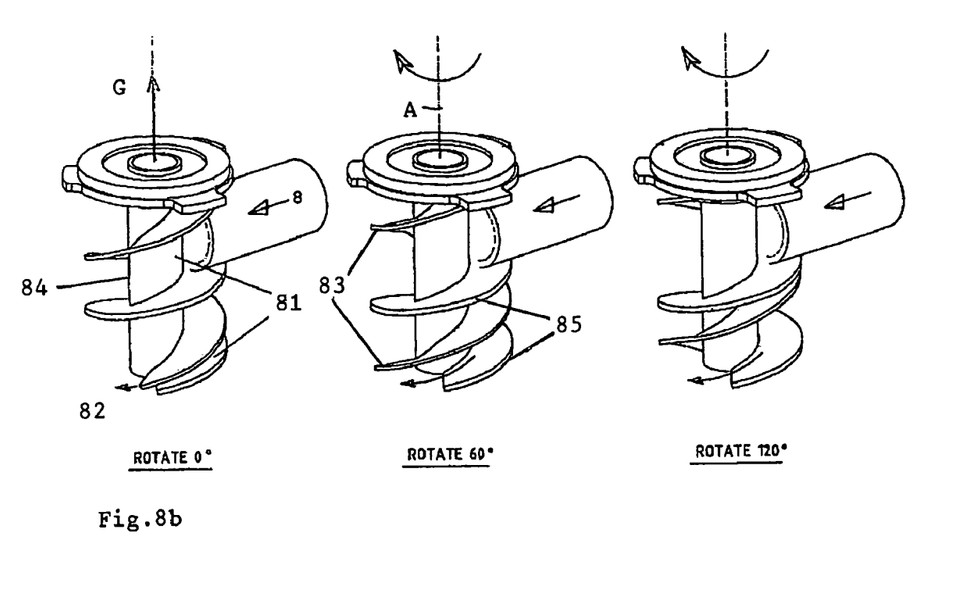
FIG. 8b is a schematic perspective view of an inlet device comprising movable means for closing and designed as variable "winding stair", according to a further embodiment of the invention.

FIG. 8b shows a preferred embodiment of an inlet device of a cyclone, with the wall portion of its outer tubular cylinder and cap removed, designed as a variable or movable "winding stair" comprising an inlet opening 8 and a helical-shaped vane preferably arranged to a rotationally movable hollow cylinder or the like, which functions as a vortex finder for the separated lighter component of the fluid, for example a gas G. The fluid to be separated into its components enters the inlet device in the radial direction through the inlet opening 8 into a first annular helical-shaped path. The fluid passes downwards along the outside of the wall of the hollow cylinder through the "winding stair" from the annular helical path into a second annular path 82, which is arranged below the first helical-shaped path, i.e. the first and at least the initial part of the second annular path have the same diameter (as in the embodiment according to FIG. 8a).

The "winding stair" is rotationally movable about an axis of rotation R. By rotating the "winding stair" the cross sectional area of the fluid passage from the first helical path 81 into the second annular path 82 is varied. Thus, the movable closing means according to this preferred embodiment comprises said movable "winding stair". In particular, as illustrated in FIG. 8a, at least one first helical-shaped vane 83 defining the roof of the helical shaped path 81 is fixed to the inner hollow cylinder 84 (vortex finder), which is rotational movable about the axis R. At least one second helical-shaped vane 85 defining the bottom of the helical-shaped path 81 is fixed to the outer tubular cylinder (not shown), which will not be rotated. By rotating the inner tubular cylinder clock-wise, the first helical-shaped vane 83 will move clock-wise increasing the height of the fluid passage from the first helical shaped path 81 into the second annular path 82, as shown in FIG. 8b. By rotating the inner tubular cylinder anticlock-wise, the first helical-shaped vane 83 will move anticlock-wise decreasing the height of the fluid passage from the first helical shaped path 81 into the second annular path 82.

Figure 9:
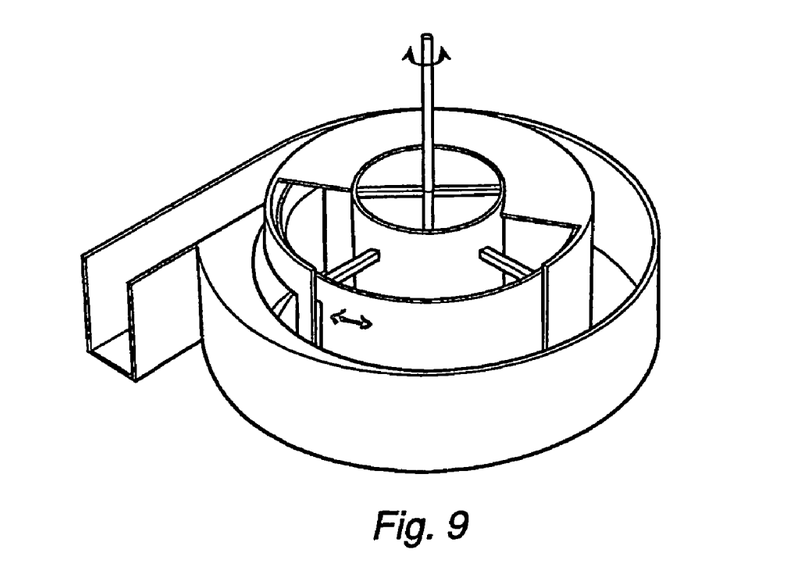
FIG. 9 is a schematic perspective view of an inlet device comprising movable means for closing having a sliding door according to still another embodiment of the invention.

FIG. 9 shows a further embodiment of the inlet device, with its upper wall portion removed, comprising one single inlet channel and a movable closing means arranged at the bottom of the inlet device, i.e. at the end of the first flow path defined by the outer cylindrical wall and the inner cylindrical wall, said walls being arranged generally concentrically. The fluid to be separated into its components is tangentially introduced to the inlet device via the inlet opening to the first flow path and enters tangentially through the flow passage comprising of the moveable closing means into the annular space of the second flow path at least partly defined by the inner cylindrical wall. As shown in the figure, the closing means is in the form of a sliding door that preferably is arranged along the periphery of the inner cylindrical wall. The sliding door is actuated and moved sideways along the periphery of the inner cylindrical wall by means of an actuator (not shown) connected to a concentrically arranged rod arrangement by a rotational movement. This rotational movement is translated to a sideways movement of the sliding door arranged at the one end of the rod arrangement, as shown in the Figure, for closing and thus controlling the cross section area of the flow passage from the first annular path to the second annular path.

FIG. 10a is a schematic cross sectional view that shows a gravity separator in which a multiphase cyclone with the inventive inlet device is arranged at its inlet, and FIG. 10b a schematic cross sectional view that shows a separation system comprising a gravity separator and the multiphase cyclone arranged outside and upstream thereof.

It should be realised that the above presentation of the invention has been made by way of example, and that alternative embodiments will be obvious for a person skilled in the art. However, the scope of protection claimed is defined in the patent cams supported by the description and the annexed drawings.

The invention claimed is:

1. An inlet device to a separator, said device comprising:
   a generally tubular outer wall,
   a generally tubular inner wall,
   said outer and inner wall defining at least a part of a first annular path between them,
   and an inlet opening for the passage of a fluid through the outer wall into the first annular path,
   at least one communication channel for the passage of a fluid from the first annular path into a second annular path, said fluid comprising two or more phases being subjected to separation,
   at least one movable closing means for at least partial closure of the fluid passage from said first annular path into said second annular path,
   wherein said at least one communication channel for the passage of the fluid is arranged to extend along the outside of the inner wall downwards from the first annular path into the second annular path, and wherein the second annular path is arranged below the first annular path.

2. The inlet device according to claim 1, further comprising:
   a plurality of communication channels each of which is provided with a movable closing means.

3. The inlet device according to claim 2, wherein the movable closing means comprises a set of curved vanes designed as a helix or a "winding stair" type.

4. The inlet device according to claim 3, wherein at least one of the curved vanes is rotationally movable.

5. The inlet device according to claim 1, further comprising:
   a movable closing means comprising at least one first helical-shaped vane fixed to a hollow cylinder which is rotationally movable about an axis, and at least one second helical-shaped vane fixed to an outer tubular cylinder, wherein the first annular path is formed between said helical-shaped vanes.

6. The inlet device according to claim 1, wherein the first annular path is helical-shaped.

7. The inlet device according to claim 1, wherein the movable closing means comprises a turning shutter or a throttle-valve.

8. The inlet device according to claim 1, wherein said at least one communication channel is located at the bottom end of the first annular path.

9. The inlet device according to claim 1, wherein the inlet opening is arranged to promote a tangential flow of the fluid into and inside the first annular path.

10. A separator, comprising the device according to claim 1.

11. The separator according to claim 10, further comprising a cyclone.

12. A method of controlling the introduction of a fluid into a separator, in which the fluid is introduced, under tangential g-force-generating movement thereof into a second annular path via an inlet opening through an outer tubular wall and a first annular path between the outer tubular wall and inner tubular wall, said fluid comprising two or more phases being subjected to separation, wherein the cross section area of the fluid passage from the first annular path into the second annular path is controlled by means of at least one moveable closing means based on at least one process parameter, and wherein said second annular path is located below said first annular path.

13. The method according to claim 12, wherein the fluid is introduced, from the first annular path, into the second annular path via at least one communication channel arranged at the bottom end of the first annular path.

14. The method according to claim 13, wherein the communication channel is closed through a rotational movement of the closing means that fits slidingly in the communication channel.

* * * * *

UNITED STATES PATENT AND TRADEMARK OFFICE
CERTIFICATE OF CORRECTION

PATENT NO.        : 7,625,416 B2                                                             Page 1 of 1
APPLICATION NO.  : 10/555814
DATED             : December 1, 2009
INVENTOR(S)       : Nilsen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 688 days.

Signed and Sealed this

Twenty-sixth Day of October, 2010

David J. Kappos
*Director of the United States Patent and Trademark Office*